(12) United States Patent
Offner et al.

(10) Patent No.: US 10,055,333 B2
(45) Date of Patent: Aug. 21, 2018

(54) DEBUGGING A GRAPH

(71) Applicant: Ab Initio Technology LLC, Lexington, MA (US)

(72) Inventors: Carl Offner, Sudbury, MA (US); Brond Larson, Sharon, MA (US); Paul Bay, Arlington, MA (US); Dan Teven, Sharon, MA (US); Joel Gould, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 506 days.

(21) Appl. No.: 14/715,904

(22) Filed: May 19, 2015

(65) Prior Publication Data
US 2016/0124998 A1   May 5, 2016

Related U.S. Application Data

(60) Provisional application No. 62/075,466, filed on Nov. 5, 2014.

(51) Int. Cl.
*G06F 17/30* (2006.01)
*G06F 11/36* (2006.01)
*G06F 8/41* (2018.01)

(52) U.S. Cl.
CPC ............ *G06F 11/3636* (2013.01); *G06F 8/41* (2013.01); *G06F 17/30398* (2013.01)

(58) Field of Classification Search
CPC .................................................. G06F 17/30398
USPC .................................................. 707/798, 609
See application file for complete search history.

(56) References Cited

U.S. PATENT DOCUMENTS

| | | | |
|---|---|---|---|
| 5,966,072 A | 10/1999 | Stanfill et al. | |
| 6,102,968 A | 8/2000 | Colby et al. | |
| 7,164,422 B1 | 1/2007 | Wholey, III et al. | |
| 7,167,580 B2 | 1/2007 | Klein et al. | |

(Continued)

FOREIGN PATENT DOCUMENTS

| | | |
|---|---|---|
| JP | H05-265802 A | 10/1993 |
| JP | 2007-316884 A | 6/2007 |
| JP | 2008-524671 T | 7/2008 |

OTHER PUBLICATIONS

"Tools and Strategies for Debugging Distributed Stream Processing Applications", by: Gedik, Published 2009 http://www.cs.bilkent. edu.tr/~bgedik/homepage/lib/exe/fetch.php/wiki:pubs:stream-de-bugging.pdf.*

(Continued)

*Primary Examiner* — Chelcie Daye
(74) *Attorney, Agent, or Firm* — Wolf, Greenfield & Sacks, P.C.

(57) ABSTRACT

In certain aspects, a method includes: receiving a first graph that includes components and flows, the components representing operations performed on data records, the flows representing flows of data records between components; receiving a specification that is separate from the first graph, the specification defining one or more insertions, each of the insertions associated with a flow of the first graph; generating one or more components that each corresponds to one of the insertions; and generating a second graph that includes components and flows that correspond to at least some of the components and flows of the first graph and the one or more generated components.

27 Claims, 10 Drawing Sheets

(56) References Cited

U.S. PATENT DOCUMENTS

| | | | |
|---|---|---|---|
| 8,484,159 B2* | 7/2013 | Stanfill | G06F 8/51 707/609 |
| 8,627,296 B1 | 1/2014 | Picard | |
| 8,661,154 B2 | 2/2014 | Farver et al. | |
| 2004/0205208 A1 | 10/2004 | Koponen et al. | |
| 2005/0027860 A1 | 2/2005 | Benson et al. | |
| 2005/0114369 A1 | 5/2005 | Gould et al. | |
| 2006/0095466 A1 | 5/2006 | Stevens et al. | |
| 2007/0271381 A1 | 11/2007 | Wholey et al. | |
| 2008/0049022 A1 | 2/2008 | Sherb et al. | |
| 2008/0229334 A1 | 9/2008 | Graham et al. | |
| 2008/0256014 A1 | 10/2008 | Gould et al. | |
| 2008/0270920 A1 | 10/2008 | Hudson | |
| 2009/0083313 A1 | 3/2009 | Stanfill et al. | |
| 2009/0119302 A1 | 5/2009 | Palmer et al. | |
| 2009/0150518 A1 | 6/2009 | Lewin et al. | |
| 2009/0187654 A1 | 7/2009 | Raja et al. | |
| 2009/0327196 A1 | 12/2009 | Studer | |
| 2010/0169392 A1 | 7/2010 | Lev Ran et al. | |
| 2010/0241694 A1 | 9/2010 | Jensen et al. | |
| 2011/0153711 A1 | 6/2011 | Farver et al. | |
| 2011/0283239 A1 | 11/2011 | Krishnan et al. | |
| 2011/0307897 A1* | 12/2011 | Atterbury | G06F 9/44521 718/102 |
| 2012/0131559 A1 | 5/2012 | Wu et al. | |
| 2014/0143757 A1 | 5/2014 | Buxbaum et al. | |
| 2014/0164495 A1 | 6/2014 | Farver et al. | |
| 2014/0189650 A1 | 7/2014 | Gounares | |
| 2016/0248643 A1 | 8/2016 | Farver et al. | |

OTHER PUBLICATIONS

International Search Report dated Feb. 15, 2016 from corresponding International Application No. PCT/US2015/059280.
Examination Report No. 1 for Australian Application No. AU 2016201350 dated Dec. 21, 2016.
International Search Report and Written Opinion for International Application No. PCT/US2010/060270 dated Apr. 29, 2011.
International Preliminary report on Patentability for International Application No. PCT/US2010/060270 dated Jun. 28, 2012.
International Preliminary report on Patentability for International Application No. PCT/US2015/059280 dated May 18, 2017.
Canadian Office Action for Application No. CA 2782402 dated Feb. 10, 2017.
Chinese Office Action and English translation thereof dated Jul. 8, 2014 in connection with Chinese Application No. 2010-80063818.8.
Japanese Office Action and English translation thereof dated Nov. 14, 2014 in connection with Japanese Application No. 2012-543341.
Korean Office Action for Application No. 10-2012-7017686 dated Dec. 14, 2016.
Gedik et al., Tools and strategies for debugging distributed stream processing applications. Software Practice and Experience. Oct. 2, 2009; (39):1347-76.
U.S. Appl. No. 15/068,432, filed Mar. 11, 2016, Farver et al.
AU 2016201350, Dec. 21, 2016, Examination Report No. 1.
PCT/US2010/060270, Apr. 29, 2011, International Search Report and Written Opinion.
PCT/US2010/060270, Jun. 28, 2012, International Preliminary Report on Patentability.
PCT/US2015/059280, May 19, 2017, International Preliminary Report on Patentability.

* cited by examiner

200

```
// Each overlay file starts with a 3-line header
1 // version
$AI_MP/example_graph.mp // The graph these insertions will be applied
to.
1 // order insertions on write
// end of header; beginning of first insertion
ins_1_source.dat // name of the insertion         ←————— 202
Replicate/out // upstream port ←————————————————— 204
Reformat/in // downstream port ←————————————————— 206
0 // sequence number at upstream port
0 // is_probe it's a test source  ←————————————— 208
0 // is_local_file_probe ignored; only for probes
0 // is_phased_file_probe ignored; only for probes
0 // is_clean ignored; only for probes
1 // is_required ignored; only for probes
0 // is_modified
2 // number_of_parameters
!prototype_path|PF$|||$AB_COMPONENTS/Datasets/Input_File.mdc ←— 210
Layout|$|||file:$AI_SERIAL/test_source_for_replicate.dat ←————— 212
// end of first insertion; beginning of second insertion
ins_2.dat // name of the insertion  ←——————————————————— 214
Gather/out // upstream port  ←——————————————————————————— 216
OutputDataSource/in // downstream port ←————————————————— 218
0 // sequence number at upstream port
1 // is_probe it's a probe  ←———————————————————————————— 220
0 // is_local_file_probe
0 // is_phased_file_probe
0 // is_clean
1 // is_required
0 // is_modified ignored; only for test sources
1 // number_of_parameters
!prototype_path|PF$|||$AB_COMPONENTS/Datasets/Output_File.mdc ←— 222
```

201 { (first insertion block)

213 { (second insertion block)

FIG. 2

DEBUGGING A GRAPH

CLAIM OF PRIORITY

This application claims priority to U.S. Provisional Patent Application Ser. No. 62/075,466, filed on Nov. 5, 2014, the entire contents of which are hereby incorporated by reference.

BACKGROUND

This description relates to debugging a graph.

Code developers often debug source code throughout the development process. In doing so, the source code can be modified with debug code which can impact the functionality of the source code. It is often desirable to remove the added debug code from the source code when debugging has concluded in order to restore the original functionality of the source code.

SUMMARY

In one aspect, a method includes receiving a first graph that includes components and flows. The components represent operations performed on data records. The flows represent flows of data records between components. The method also includes receiving a specification that is separate from the first graph. The specification defines one or more insertions. Each of the insertions is associated with a flow of the first graph. The method also includes generating one or more components that each corresponds to one of the insertions. The method also includes generating a second graph that includes components and flows that correspond to at least some of the components and flows of the first graph and the one or more generated components.

Implementations can include one or more of the following features.

In some implementations, one of the generated components is a probe that is configured to monitor data related to a data record as the data record passes between components of the second graph.

In some implementations, the probe is configured to store the data related to the one or more data records.

In some implementations, one of the generated components is a test source that is configured to provide data to one of the components of the second graph.

In some implementations, the method also includes executing the second graph.

In some implementations, fewer than all of the components of the second graph are executed.

In some implementations, the components of the second graph that are executed include components whose operations impact one or more of the generated objects.

In some implementations, one of the generated components is a probe. The components of the second graph that are executed include components that provide data to the probe.

In some implementations, one or more components of the second graph that reside downstream from the probe are not executed.

In some implementations, one of the generated components is a test source. One or more components of the second graph that reside upstream of the test source are not executed.

In some implementations, the method also includes modifying a parameter associated with one of the components of the second graph. The method also includes determining whether the modified component, when executed, impacts any of the generated components. The method also includes re-executing the second graph.

In some implementations, if the modified component, when executed, does not impact any of the generated components, the modified component is not re-executed.

In some implementations, one of the generated components is a probe. The modified component resides upstream of a flow associated with the probe.

In some implementations, the first graph and the specification are stored in separate files.

In some implementations, the first graph and the second graph are stored in separate files.

In some implementations, the second graph is a shell script that is not stored in a file.

In some implementations, in the second graph, one of the generated components provides data to a component that corresponds to a component in the first graph that receives data from the flow that is associated with the generated component.

In some implementations, in the second graph, one of the generated components receives data from a component that corresponds to a component in the first graph that provides data to the flow that is associated with the generated component.

In some implementations, the second graph is generated without the first graph being modified.

In some implementations, generating the second graph includes generating a copy of at least a portion of the first graph. Generating the second graph also includes modifying the copy of the first graph to include the one or more generated components.

In another aspect, a system includes at least one processor. The system also includes means for receiving a first graph that includes components and flows. The components represent operations performed on data records. The flows represent flows of data records between components. The system also includes means for receiving a specification that is separate from the first graph. The specification defines one or more insertions. Each of the insertions is associated with a flow of the first graph. The system also includes means for generating one or more components that each corresponds to one of the insertions. The system also includes means for generating a second graph that includes components and flows that correspond to at least some of the components and flows of the first graph and the one or more generated components.

In another aspect, a computer system includes a processor configured to receive, from a code repository, a first graph that includes components and flows. The components represent operations performed on data records. The flows represent flows of data records between components. The processor is also configured to receive, through a user interface, a specification that is separate from the first graph. The specification defines one or more insertions. Each of the insertions is associated with a flow of the first graph. The computer system also includes a compiler configured to generate one or more components that each corresponds to one of the defined insertions. The compiler is also configured to generate a second graph that includes components and flows that correspond to at least some of the components and flows of the first graph and the one or more generated components.

In another aspect, a computer-readable device stores a computer program. The computer program includes executable instructions for causing a computer to receive a first graph that includes components and flows. The components represent operations performed on data records. The flows represent flows of data records between components. The computer program also includes executable instructions for causing the computer to receive a specification that is separate from the first graph. The specification defines one or more insertions. Each of the insertions is associated with a flow of the first graph. The computer program also includes executable instructions for causing the computer to generate one or more components that each corresponds to one of the insertions. The computer program also includes executable instructions for causing the computer to generate a second graph that includes components and flows that correspond to at least some of the components and flows of the first graph and the one or more generated components.

In another aspect, a method includes identifying a data processing element of a first version of a computer program. The data processing element is configured to i) receive data from or ii) provide data to a first data element. The method also includes generating a component that represents a second data element. The method also includes generating a second version of at least a portion of the computer program. The second version of the computer program includes the identified data processing element. The second version of the computer program includes the generated component such that the identified data processing element in the second version of the computer program i) receives data from or ii) provides data to the generated component.

Implementations can include one or more of the following features.

In some implementations, the method also includes receiving the first version of the computer program.

In some implementations, generating the second version of at least a portion of the computer program includes generating a copy of the portion of the computer program.

In some implementations, the method also includes modifying the copy of the portion of the computer program to include the generated component.

Aspects can include one or more of the following advantages.

Objects that correspond to defined insertions can be created at the beginning of code generation and added to a graph as ordinary components, all while keeping the graph separate from the overlay specification that defines the insertions. As such, a developer can modify and debug a graph while avoiding the risk of inadvertently breaking the original graph.

Furthermore, a developer who does not have permission to edit a graph can modify the graph using insertions.

Other features and advantages of the invention will become apparent from the following description, and from the claims.

DESCRIPTION OF DRAWINGS

FIG. 2 is an example of an overlay specification.

DESCRIPTION

Figure 1:
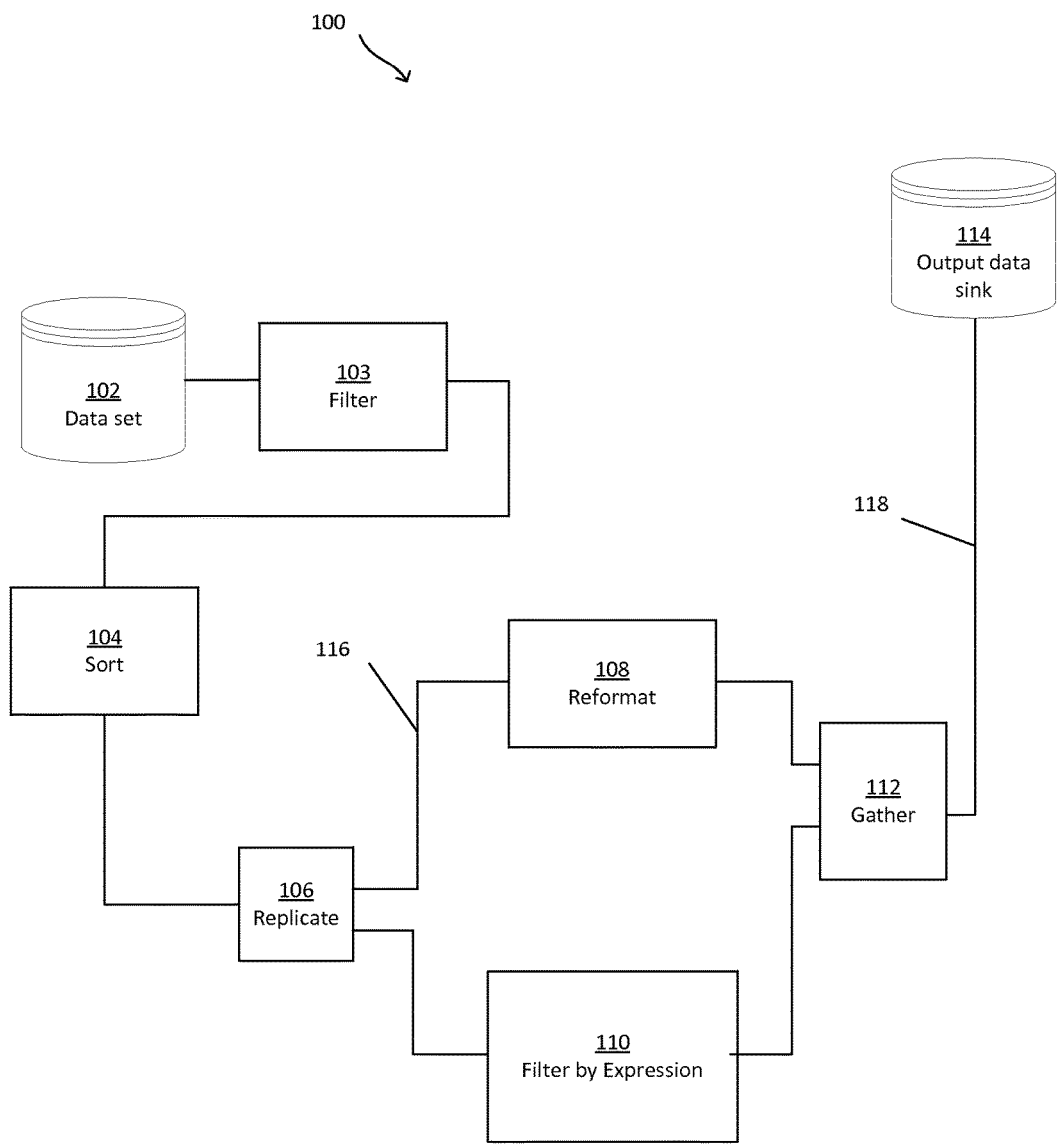
FIG. 1 is an example of a graph.

A graph may be written by one person and tested by another. In order to fully test the graph, a tester may need to access data as it flows through the graph. For example, a tester may wish to verify the data as it flows from one component of the graph to another. In some implementations, a tester may have verified that an upstream process functions correctly but may not have verified the functionality of downstream processes. In some implementations, the upstream process may take a relatively long time to execute, resulting in inefficient testing. Testing efficiency can be improved if the tester can replace the execution of previously-validated upstream operations with previously-validated data.

In a conventional development environment, the tester would typically need to modify the graph in order to add a watch point or replace upstream components with pre-validated data. However, once the graph has been edited, the tester cannot be sure that he has not modified the functionality of the original graph. In some environments, the tester may lack the necessary permissions to edit the graph.

A graph-based process can be debugged and tested using an overlay file (e.g., an overlay specification) that is separate from the graph. The overlay specification can be a separate file that defines one or more insertions. Insertions can be represented by components that are associated with a flow of the graph. The components that correspond to the insertions can be probes or test sources. A probe can monitor data passing between components as the graph executes, and can cause the data to be saved for later examination or reuse. A test source can provide data to a component of the graph, for example, so that upstream computations do not need to be rerun for each execution of the graph.

Components that correspond to the insertions defined in the overlay specification can be included in a graph without becoming a part of the original graph. When the original graph is compiled, a compiler considers the overlay file and generates a second graph that includes components that correspond to the insertions (sometimes referred to herein as insertion components). The second graph (e.g., the graphs 400*a-d* shown in FIGS. 4*a-d*) includes components and flows that correspond to at least some of the components and flows of the original graph. The second graph also includes the components that correspond to the insertions defined in the overlay specification. The second graph may be a second version of the original graph 100 or a copy of the original graph 100. In some implementations, generating the second graph includes generating a copy of at least a portion of the original graph 100 and modifying the copy to include one or more components that correspond to the insertions. In some implementations, the second graph is a shell script and is not stored in a file. In some implementations, the second graph and the first graph are stored in separate files.

It is important to note that the incorporation of the insertion components into the second graph does not modify the original graph being debugged. Instead, the insertion definitions remain in a separate file (e.g., the separate overlay specification) and can be turned into ordinary graph components for inclusion in the second graph at the beginning of the code generation. As such, there is no risk of inadvertently breaking the original graph during debugging.

FIG. 1 shows an example of a graph 100 that may be debugged or tested. The graph 100 includes data processing components connected by flows. A data set 102 that includes one or more data records is connected to a filter component 103. A connection between two components indicates that output records from the first component (in this example, the data set 102) are passed to the second component (in this example, the filter component 103). In general, a filter component filters or removes records that do not meet predetermined criteria. For example, the filter component 103 may pass data records of customers who live in Ohio and rejects other records data. The filter component 103 is connected to a sort component 104 that sorts the filtered data records (e.g., by a zip code associated with the customer). The sort component 104 is connected to a replicate component 106 that creates a copy of data records so that they can be processed in two different ways. The replicate component is connected to a reformat component 108 and a filter by expression component 110. For example, one instance of data records of customers who live in Ohio, which are sorted by zip code, is sent to the reformat component 108, and another instance of the data records is sent to the filter by expression component 110. The reformat component 108 changes the format of the data records into a different data format, and the filter by expression component 110 removes data records based on an expression associated with the data record. The reformat component 108 and the filter by expression component 110 are connected to a gather component 312 that combines the received data records, and the gather component is connected to an output data sink component 114 (e.g., a database). While the graph 100 includes multiple flows between components, the replicate-reformat flow 116 and the gather-output data sink flow 118 are of particular interest in this example.

A tester of the graph 100 may wish to debug the graph 100 in order to verify its functionality. For example, a tester may want to monitor and verify data as it flows from one component to another. Alternatively, a tester may want to prevent one or more upstream components in a graph 100 from executing, and instead provide data to a component (e.g., a downstream component) that would otherwise receive data from the upstream component. In doing so, it may be desirable to refrain from modifying the graph for various reasons. For example, a tester may not want to risk breaking the functionality of the graph. In some implementations, a tester may have limited or no access to the graph (e.g., the tester may lack the necessary permissions to edit the graph).

An overlay can be used to generate insertion components to be included in a second graph that can be used for testing purposes. FIG. 2 shows an example of an overlay specification 200 that defines an overlay. The overlay specification 200 can be stored in a file, which may be separate from a file that stores the graph. The overlay specification defines one or more insertions. When the graph is compiled, components that correspond to the insertions can be generated and added into a second graph without becoming part of the original graph. The second graph also includes components and flows that correspond to at least some of the components and flows of the original graph. Each of the insertion components in the second graph is associated with a flow of the original graph. Insertion components can be probes or test sources.

Probe

In some implementations, a probe monitors data as it is passed between components of the second graph. For example, data can be monitored, saved for later examination, or saved for re-use as the second graph executes. The overlay specification 200 can define a probe that is associated with a particular flow of the original graph. The second graph can include a flow that corresponds to this particular flow of the original graph. The second graph can also include components that correspond to components of the original graph that are associated with the particular flow. The flow in the second graph represents a flow of data between components that is to be monitored, and sometimes also saved, by the probe. The probe can be configured to report particular values, or report when a particular value is within or outside of a predetermined range. Data monitored by the probe may be saved for later analysis or use. In some implementations, the data can be stored in a flat file or relational database.

Test Source

In some implementations, the results of the execution of the original graph up to a certain point (e.g., up to a position of a particular component) may have been previously verified. In such cases, it may be inefficient for upstream components to reprocess functions every time the original graph executes. The overlay specification 200 can define a test source that is associated with a particular flow of the original graph. The second graph can include a flow that corresponds to this particular flow of the original graph. The second graph can also include a component that corresponds to a component of the original graph that is associated with the particular flow. The test source can provide data (e.g., previously verified data) to the component in the second graph that corresponds to the component of the original graph that is associated with the particular flow. In some implementations, the test source can be configured to pass previously-saved data to a downstream component. In this manner, entire sections of a graph that were previously executed may be bypassed.

Referring to FIG. 2, the overlay specification 200 can include one or more insertion definitions. In this example, the overlay specification 200 includes one test source definition 201 and one probe definition 213. The overlay specification 200 starts with a 3-line header that specifies the graph that the insertion definitions can correspond to. The header is followed by the test source definition 201, which includes a name 202, an upstream port 204, a downstream port 206, an insertion type 208, a prototype path 210, and a layout parameter 212.

The upstream port 204 of the test source definition 201 references a port in the graph 100, specifically, the output of the replicate component 106. The downstream port 206 points to the input of the reformat component 108. Accordingly, when the second graph is executed, the test source provides data to a component that corresponds to the reformat component 108 of the graph 100.

The insertion type 208 defines whether the insertion is a test source or a probe. A value of "0" defines a test source, and a value of "1" defines a probe. Because this insertion is a test source, the value of the insertion type 208 is "0".

The prototype path 210 indicates the type of the insertion. In this example, because this insertion is a test source, the prototype path 210 specifies an Input File component. The prototype path 210 points to a file that contains code that defines an insertion of the particular type. A layout parameter 212 defines a location of a source file that contains data that the test source will provide. In some implementations, the location is a file path. When the test source is included in the second graph, the data in the source file is provided to the input of the reformat component 108.

In some implementations, the data in the source file may be the same as the data that would pass between components during normal execution of the graph 100. However, by providing the data using a test source in the second graph, upstream components of the second graph can refrain from processing. For example, an upstream component, such as the replicate component 106, may require large amounts of system resources to process the data, or may take a relatively long time to process the data compared to other components in the graph. As such, known data (e.g., the same data that would pass between components during normal execution of the graph 100) can be provided to a component of the second graph to save time or to conserve system resources.

The test source definition 201 is followed by a probe definition 213, which includes a name 214, an upstream port 216, a downstream port 218, an insertion type 220, and a prototype path 222.

The upstream port 216 of the probe definition 213 references a port in the graph 100, specifically, the output of the gather component 112. The downstream port 218 of the probe definition 213 references the input of the output data sink component 114. Accordingly, when the second graph is executed, the probe monitors data that passes between the output of a component of the second graph that corresponds to the gather component 112 and the input of a component of the second graph that corresponds to the output data sink component 114.

The insertion type 220 of the probe definition 213 defines whether the insertion is a test source or a probe. A value of "1" defines a probe. Because this insertion is a probe, the value of the insertion type 220 is "1".

The prototype path 222 indicates the type of the insertion. In this example, because this insertion is a probe, the prototype path 222 specifies an Output File component. The prototype path 222 points to a file that contains code that defines an insertion of the particular type.

In some implementations, the data that is to be monitored by the probe is stored in a file that is automatically created by the system. The file can be stored in a location that is automatically determined by the system. In some implementations, the data can be monitored before it is stored.

As mentioned above, a compiler may consider the overlay specification 200 while compiling the original graph to generate the second graph. The compiler may accept the overlay specification 200 as an input. One or more components that correspond to insertions defined in the overlay specification 200 are generated and included in the second graph. Each of the generated insertion components corresponds to an insertion definition contained in the overlay specification 200. The insertion components may be included in the second graph (e.g., the graphs 400a-d shown in FIGS. 4a-d) along with components and flows that correspond to at least some of the components and flows of the original graph 100. The insertion components may be connected to other components or other insertion components by one or more directed flows. The overlay specification 200, or the file that stores the overlay specification, remains separate from a file containing the graph 100.

Insertion components defined in the overlay specification can be executed using one of at least two modes: Single-Execution Mode and Saved-State Mode.

Single-Execution Mode

Figure 3:
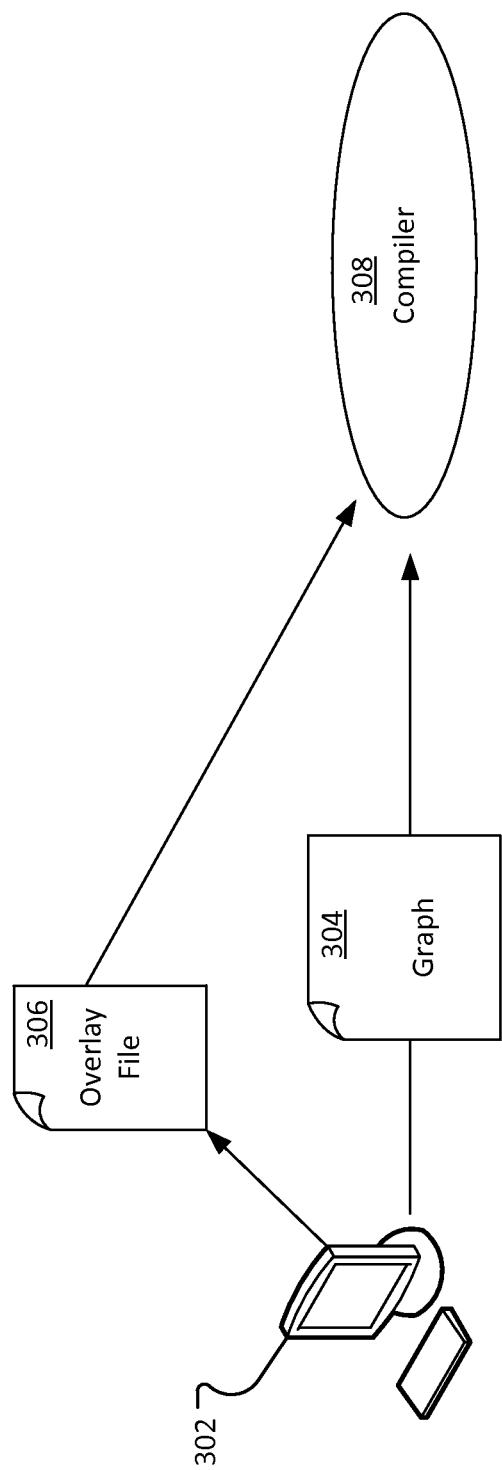
FIG. 3 illustrates an exemplary system for executing insertion definitions in Single-Execution Mode.

FIG. 3 illustrates an exemplary system for executing insertion components in Single-Execution Mode. In this example, a client 302 generates or references a graph 304 and an overlay file 306 (e.g., an overlay specification) that defines insertions. For example, the overlay file 306 may be the overlay specification 200 of FIG. 2. The graph 304 is compiled by the compiler 308. The compiler 308 considers the overlay file 306 and creates a second graph that includes the insertion components defined by the overlay file 306. The second graph can then be executed. In some implementations, the compilation and the execution occur concurrently. If the second graph is to be executed again, this process must be repeated. That is, the graph 304 would need to be re-specified, re-compiled, and the second graph would need to be re-executed.

Figure 4A:
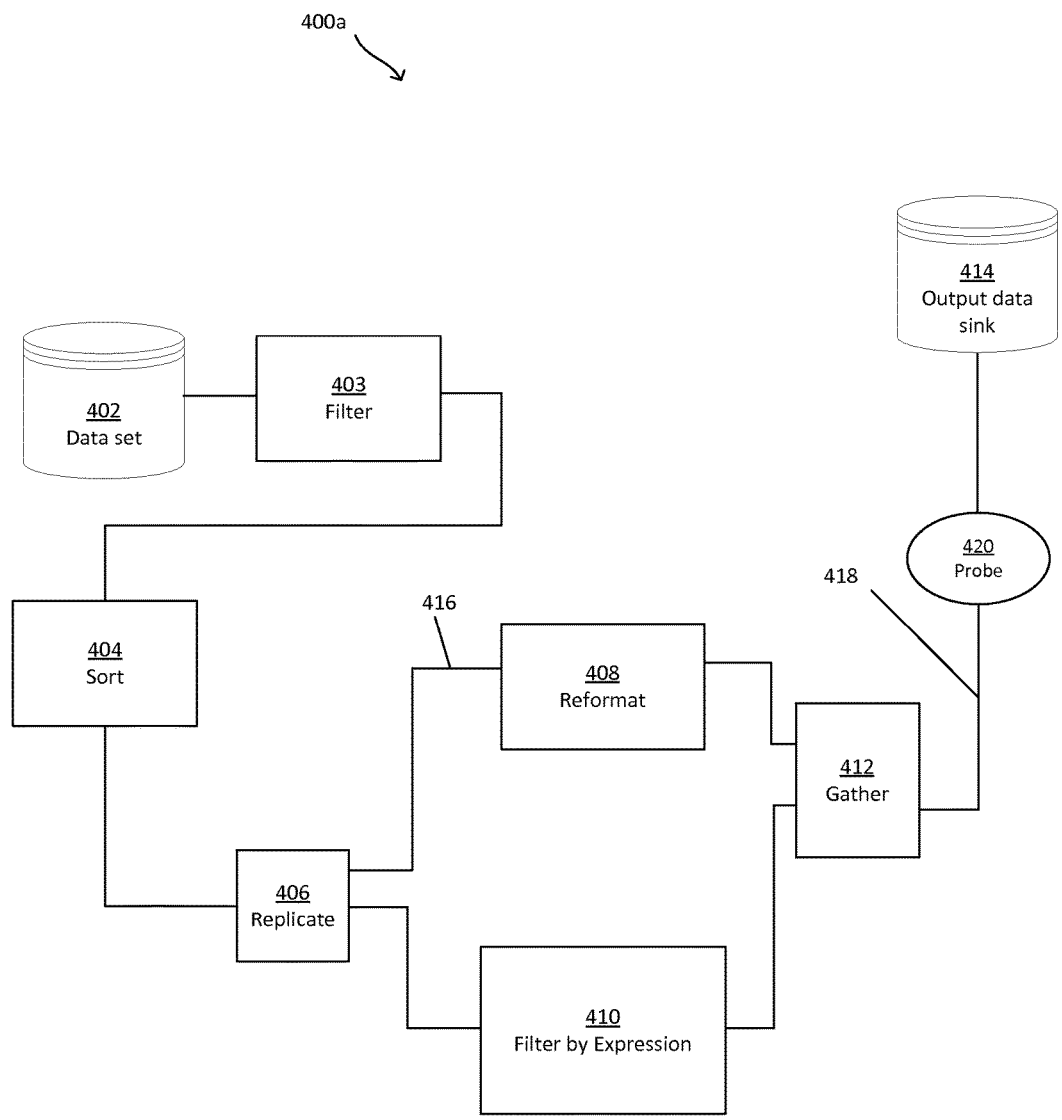
FIGS. 4*a-d* are examples of graphs that include insertion components.
Figure 4B:
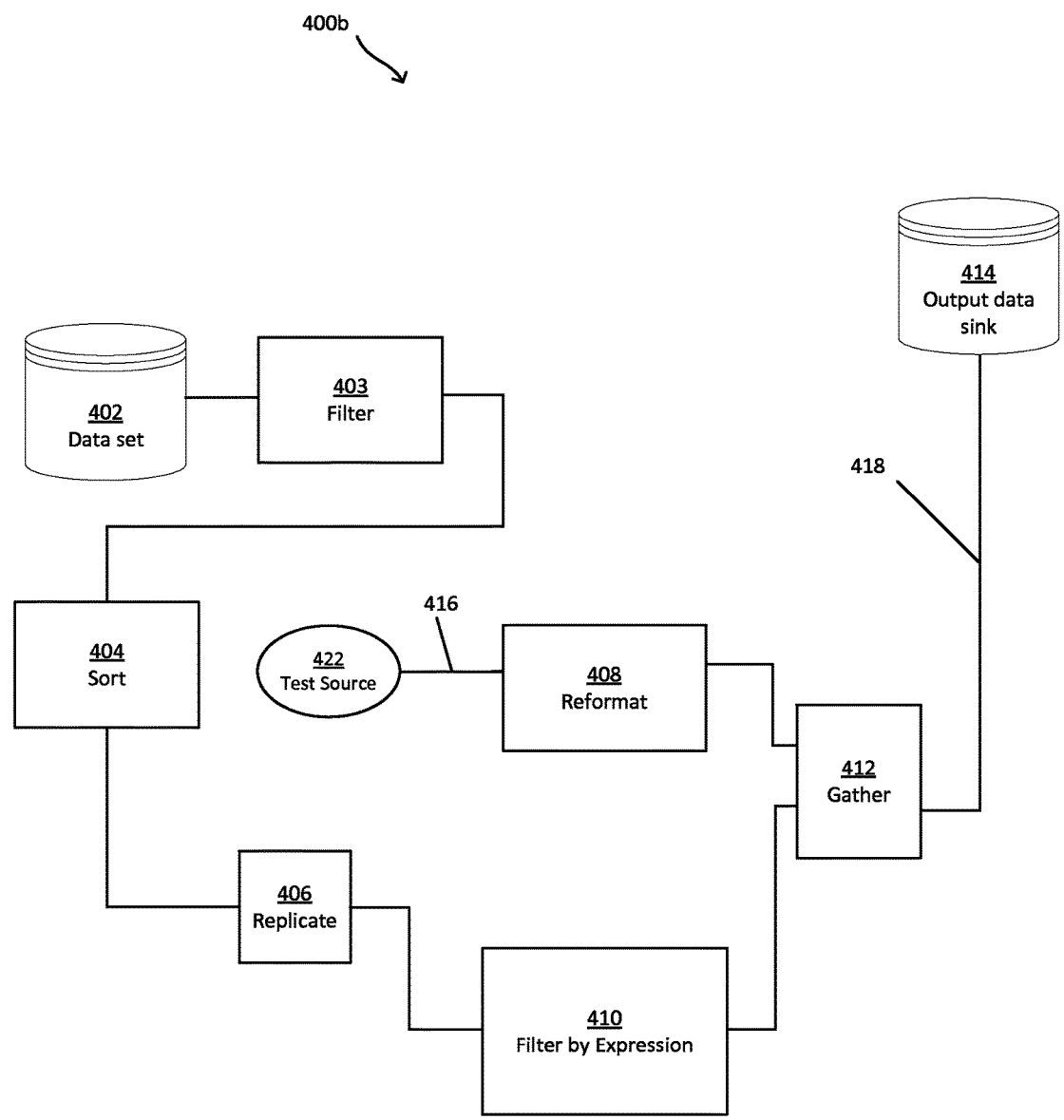
Figure 4C:
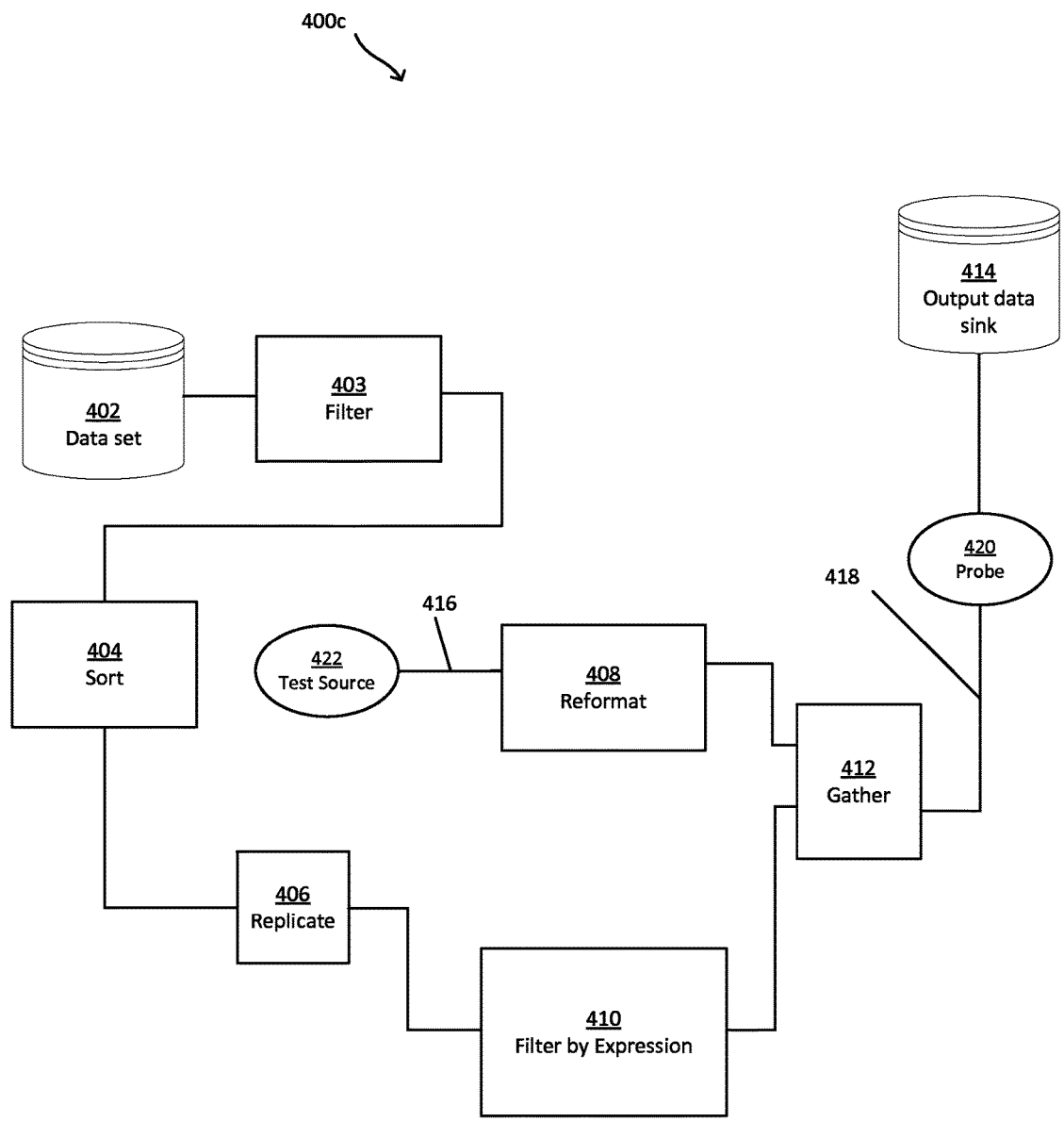

FIGS. 4a-d show examples of graphs 400a-d that include one or more insertion components. The graphs 400a-d may be examples of the second graph described above. The second graph can be a second version of the original graph 100. In these examples, the graph 100 of FIG. 1 has been compiled to create one of the graphs 400a-d, which include insertions. The insertions are defined in the overlay specification 200 of FIG. 2. In FIG. 4a, the graph 400a includes a test source insertion 422. In FIG. 4b, the graph 400b includes a probe insertion 420. In FIG. 4c, the graph 400c includes both the test source insertion 422 and the probe insertion 420. The test source insertion 422 can correspond to the test source definition 201, and the probe insertion 420 can correspond to the probe definition 213.

The graphs 400a-d also include components and flows that correspond to at least some of the components and flows of the original graph 100. In some implementations, the corresponding components and flows of the second graph may have the same or similar properties as their counterparts in the original graph 100. In some implementations, the corresponding components and flows are identical to their counterparts in the original graph 100. For example, the sort component 104 of the original graph 100 may be a second instance of the sort component 404 of the graph 400a.

In these examples, the insertion components were generated when a compiler compiled the graph 100. While FIGS. 4a-d show graphs 400a-d that include the insertion components, the original graph 100 remains unmodified.

Referring to FIGS. 4a and 4c, the probe insertion 420 is positioned at a flow 418 that represents flows of data from the output of the gather component 412 to the input of the output data sink component 414. The flow 418, the gather component 412, and the output data sink component 414 correspond to the flow 118, the gather component 112, and the output data sink component 114, respectively, of the original graph 100 of FIG. 1. The location of the probe insertion 420 is based on the defined upstream port 216 and downstream port 218 in the probe definition 213 (shown in FIG. 2). When the graph 400a, 400c is executed, data that flows from the gather component 412 to the output data sink component 414 is monitored by the probe insertion 420. In some implementations, the data is also stored by the probe insertion 420 in a file that is automatically created by the system. As mentioned above, if the second graph is to be executed again, the graph would need to be re-specified, re-compiled, and the second graph would need to be re-executed. If the second graph were to be executed again, the probe insertion 420 would be repopulated with data.

Referring to FIGS. 4b and 4c, the test source insertion 422 is positioned at a flow 416 that represents flows of data to the input of the reformat component 408. The flow 416 and the reformat component 408 correspond to the flow 116 and the reformat component 108, respectively, of the original graph 100 of FIG. 1. The location of the test source insertion 422 is based on the defined upstream port 204 and the downstream port 206 in the test source definition. When the graph 400b, 400c is executed, data from the source file identified by the layout parameter 212 in the test source definition 201 flows to the reformat component 408. This data flows to the gather component 412 along with data that flows from the filter by expression component 410. The data that flows from the gather component 412 is ultimately stored in the output data sink 414, which may be a database.

Figure 4D:
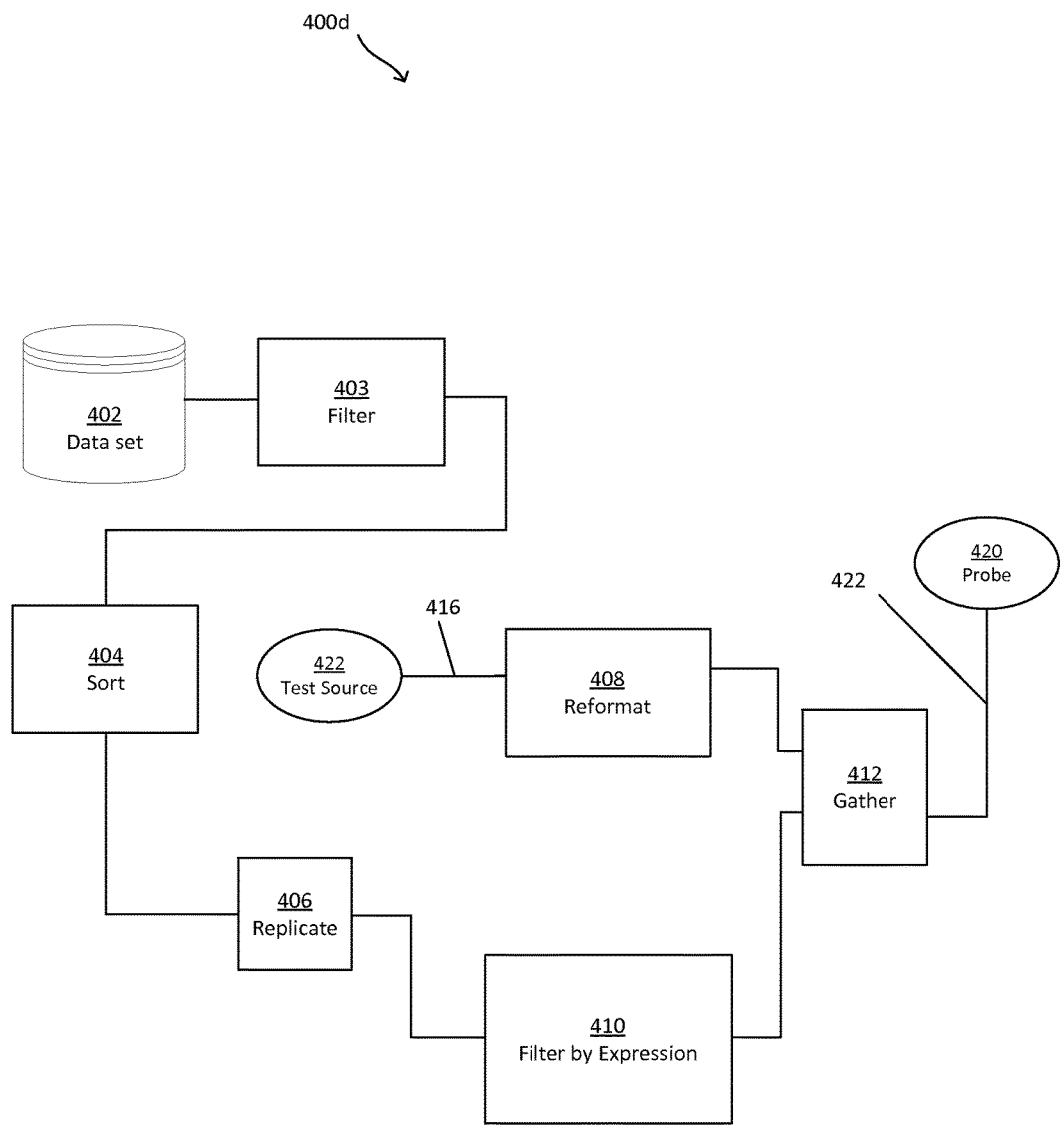

In some implementations, a tester may want to monitor data using the probe insertion 420 without the data being written to a database, such as the output data sink 414. For example, the tester may want to test the graph using experimental data without the risk of compromising the database. Referring to FIG. 4d, the graph 400d includes both the test source insertion 422 and the probe insertion 420. When the graph 400d is executed, experimental data from the source file identified by the layout parameter 212 in the test source definition 201 flows to the reformat component 408. This data flows to the gather component 412 along with data that flows from the filter by expression component 410. The data that flows from the gather component 112 is monitored by the probe insertion 420. In some implementations, the data is also stored by the probe insertion 420 in a file that is automatically created by the system.

Saved-State Mode

Figure 5:
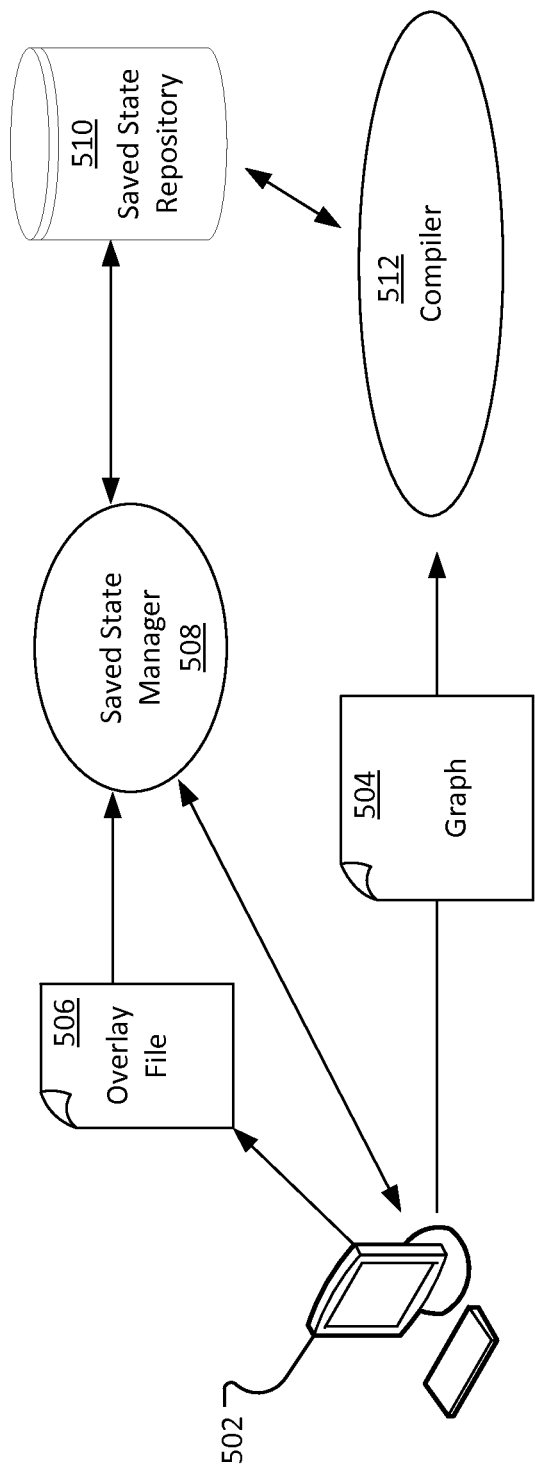
FIG. 5 illustrates an exemplary system for executing insertion definitions in Saved-State Mode.

FIG. 5 illustrates an exemplary system for executing insertions components in Saved-State Mode with a saved state manager 508. In this example, a client 502 generates or references a graph 504 and an overlay file 506 (e.g., an overlay specification) that defines insertions. For example, the graph 504 may be the graph 100 of FIG. 1, and the overlay file 506 may be the overlay specification 200 of FIG. 2. The saved state repository 510 is managed by the saved state manager 508 and a compiler 512. The saved state manager 508 can also identify where saved state data is located within the saved state repository 510. The graph 504 is compiled by the compiler 512. The compiler 512 considers the overlay file 506 and creates a second graph that includes the insertion components defined by the overlay file 506. The second graph can then be executed. In some implementations, the compilation and the execution occur concurrently.

Saved-State Mode differs from Single-Execution Mode in that Saved-State Mode allows the second graph to execute a number of times while saving information between executions. For example, referring to FIGS. 4a-d, if the insertion components were executed using Saved-State Mode, the probe insertion 420 that was populated on the first execution of the second graph may not need to be repopulated during a second execution. In some implementations, the probe insertion 420 can be internally transformed into a test source on the second execution. In other words, because the probe insertion 420 is populated on the first execution of the second graph, the probe insertion 420 could provide the populated data to a component of the second graph (e.g., the output data sink component 414 of FIGS. 4a and 4c).

The saved state manager 508, which can reside in a saved state manager directory, manages the saved state. Examples of information that can be saved in the saved state repository 510 include information related to probes, information related to test sources, information related to the overlay file 506, and parameters (e.g., attributes) associated with graph components, among other information.

In some implementations, when a graph is executed, only particular portions of the graph are executed (e.g., only particular components of the graph are executed). In some implementations, fewer than all of the components of the graph are executed. In implementations in which the graph includes insertion components (e.g., in the graphs 400a-d of FIGS. 4a-d), the graph might only execute components whose operations will impact an insertion component. For example, the graph may only execute portions of the graph that include components that provide data to a probe. In some implementations, components that reside downstream from the probe may not need to be executed.

In some implementations, a probe is populated on the first execution of the graph. Between executions, parameters of one or more of the graph components may change. A component's parameters define how the component operates. By keeping track of the parameters associated with the components, the compiler 512 can determine when a parameter change has occurred in a component. A last value table keeps track of the parameters associated with the graph components. When the graph is run, the last value table is compared to the current parameters of the components to determine whether any parameters have changed between runs. When a parameter change occurs, the change may or may not impact the data that is stored by the probe. The compiler 512 determines whether the change to the component will impact the data that will be stored by the probe on the next execution of the graph. If the data that will be stored by the probe would be affected by the change, then the changed component, as well as components that receive data from the changed component, may be re-executed during the next execution of the graph. In other words, a particular component that receives data from the changed component and provides data (directly or indirectly) to the probe may be re-executed if the changed component impacts the execution of the particular component, and the particular component impacts the data that is stored by the probe. In some implementations, if the data that will be stored by the probe would be unaffected by the change, then none of the components may need to be re-executed.

Figure 6:
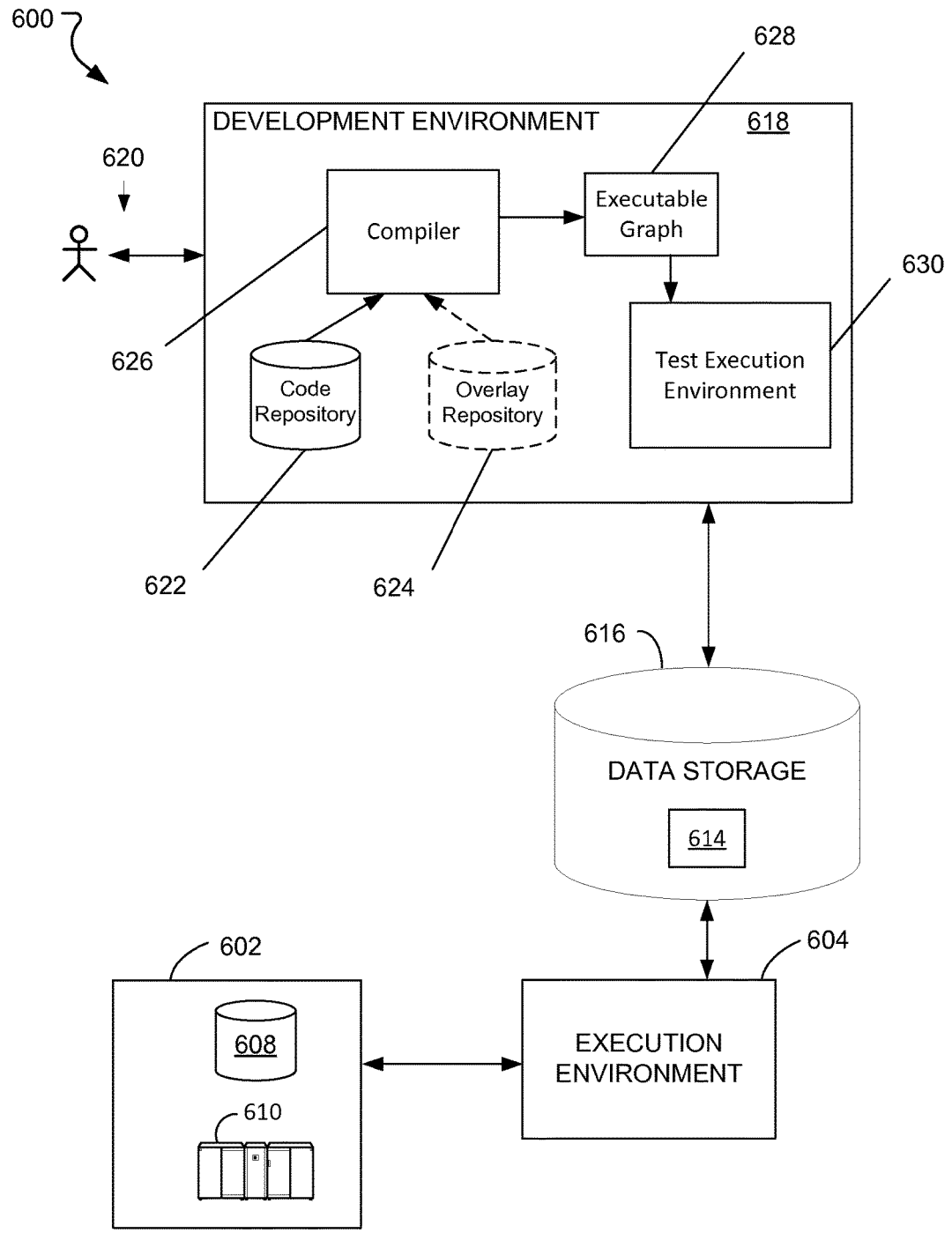
FIG. 6 is a block diagram of a system for debugging a graph.

FIG. 6 shows an exemplary data processing system 600 in which the techniques described above can be used. The system 600 includes a data source 602 that may include one or more sources of data such as storage devices or connections to online data streams, each of which may store or provide data in any of a variety of formats (e.g., database tables, spreadsheet files, flat text files, or a native format used by a mainframe). An execution environment 604 and development environment 618 may be hosted, for example, on one or more general-purpose computers under the control of a suitable operating system, such as a version of the UNIX operating system. For example, the execution environment 604 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The execution environment 604 reads data from the data source 602 and generates output data. Storage devices providing the data source 602 may be local to the execution environment 604, for example, being stored on a storage medium connected to a computer hosting the execution environment 604 (e.g., hard drive 608), or may be remote to the execution environment 604, for example, being hosted on a remote system (e.g., mainframe 610) in communication with a computer hosting the execution environment 604, over a remote connection (e.g., provided by a cloud computing infrastructure). The data source 602 may contain the data that is defined in a test source definition (e.g., the test source definition 201 of FIG. 2). That is, the layout parameter 212 of the test source definition 201 may point to a location of a source file in the data source 602.

The output data may be stored back in the data source 602 or in a data storage system 616 accessible to the execution environment 604, or otherwise used. The data storage system 616 is also accessible to the development environment 618 in which a developer 620 is able to develop, debug, and test graphs. The development environment 618 is, in some implementations, a system for developing applications as graphs that include vertices (representing data processing components or datasets) connected by directed flows (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the flows of the graph can use TCP/IP or UNIX domain sockets, or use shared memory to pass data between the processes).

The development environment 618 includes a code repository 622 for storing source code. The source code and overlay specifications (e.g., the overlay specification 220 of FIG. 2) may be developed by a developer 620 who has access to the development environment, for example, through a user interface. In some implementations, graphs and overlay specifications can be stored in the code repository 622. In some implementations, graphs are stored in the code repository 622, and overlay specifications are stored in a separate overlay repository 624.

One or both of the code repository 622 and the overlay repository 624 may be in communication with a compiler 626. The compiler 626 can retrieve a graph (e.g., from the code repository 622) and compile the graph into an executable graph 628. Examples of an executable graph include the graphs 400a-d shown in FIGS. 4a-d. The executable graph 628 can be separate from the original graph retrieved from the code repository 622. As part of compilation, the compiler 626 can consider an overlay specification. The compiler may accept the overlay specification as an input. The compiler is configured to generate one or more components that each corresponds to an insertion defined in the overlay specification. The executable graph includes components and flows that correspond to at least some of the components and flows of the original graph. The executable graph also includes the generated insertion components.

The development environment 618 can include a test execution environment 630 for executing the executable graph 628. Once a graph is compiled by the compiler 626, the executable graph 628 can be executed. Executing the executable graph 628 can include executing computations associated with the components, insertions, and directed flows of the executable graph 628 as data (e.g., work elements or data records) flows between components. In some implementations, the test execution environment 630 executes the executable graph 628 without modifying the source code of the original graph that is stored in the code repository 622 or the source code stored in the overlay repository 624. The test execution environment 630 may be accessible through an interface of the development environment 618, or may have its own interface. The interface can be configured to display information related to the executions. The interface can also be configured to display information related to the insertions (e.g., the data being monitored and saved by a probe, or the data being inserted by a test source). The test execution environment 630 may allow the developer 620 to execute the executable graph 628 multiple times and modify aspects of the executable graph 628 in between executions.

In some implementations, a developer 620 selects the graph 100 of FIG. 1 from the code repository 622. The developer 620 also selects, from the overlay repository 624, the overlay specification 200 of FIG. 2. In some implementations, instead of selecting the overlay specification 200, the developer 620 may select insertion definitions from multiple overlay specification in the overlay repository 624. The developer 620 instructs the compiler 626 to compile the graph. As part of compilation, the compiler 626 considers the overlay specification 200 and creates the executable graph 628. Examples of the executable graph 628 are the graphs 400a-d of FIGS. 4a-d, which include the insertions defined in the overlay specification 200. The executable graph 628 is then executed in the test execution environment 630.

During or after execution, the developer 620 can observe information related to the executions of the executable graph 628 components, insertions, and flows. For example, referring briefly to FIGS. 4a-d, the developer 620 may observe that the data monitored and stored by the probe insertion 420 is incorrect or unexpected. The developer 620 may select, from the overlay repository 624, a probe insertion definition that defines a probe that is configured to monitor data that flows from the reformat component 408, and a probe insertion definition that defines a probe that is configured to monitor data that flows from the filter by expression component 410. The developer 620 can analyze the data collected by these two probes to determine whether the data output from the reformat component 408 or the data output from the filter by expression component 410 is causing the data output from the gather component 112 to be incorrect or unexpected.

Continuing with this example, the developer 620 may determine that the data output from the filter by expression component 410 is incorrect or unexpected. Rather than debugging all of the components that reside upstream from the filter by expression component 410 (e.g., the filter component 403, the sort component 404, and the replicate component 406) to determine the cause of the incorrect data, the developer 620 may instead elect to provide verified data (e.g., data that is verified to be correct) to the gather component 412. The developer 620 can select, from the overlay repository 624, a test source insertion definition that defines a test source that is configured to provide data to the gather component 112. This approach may be appropriate if the developer 620 is concerned with debugging components of the graphs 400a-d that are positioned downstream from the filter by expression component 410. Such an approach can conserve system resources by reducing repetitive execution of graph components.

In some implementations, overlay specifications are not permanently stored as files in a code repository 622 or an overlay repository 624. Rather, the information that would typically be included in the overlay file (e.g., insertion definitions) is developed by the developer 620 (e.g., through the user interface) and temporarily stored in memory. The overlay information is then passed to the compiler (e.g., 308 of FIG. 3) or the saved state manager (e.g., 508 of FIG. 5).

Figure 7:
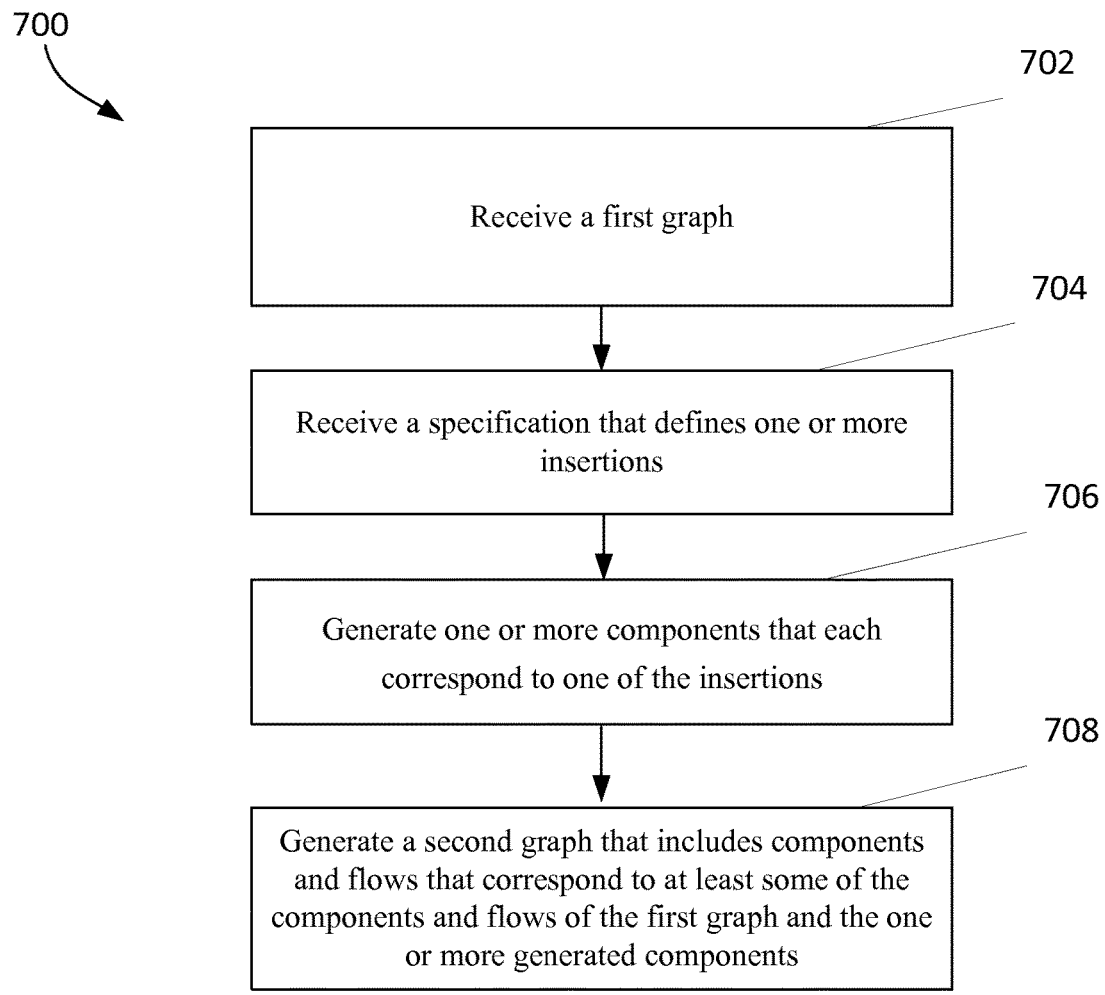
FIG. 7 is a flowchart of an exemplary graph debugging procedure.

FIG. 7 is a flowchart illustrating a debugging procedure 700. A first graph (e.g., the graph 100 of FIG. 1) is received (702). The first graph includes components and flows. The components represent operations performed on data records, and the flows represent flows of data records between components. The components may include the filter component 103, sort component 104, replication component 106, reformat component 108, filter by expression component 110, and gather component 112 shown in FIG. 1. The flows can include the replicate-reformat flow 116 and the gather-output data sink flow 118.

A specification (e.g., an overlay specification) that defines one or more insertions is received (704). The specification may be the overlay specification 200 shown in FIG. 2. The specification can include one or more insertion definitions (e.g., test source definition 201 and probe definition 213). An insertion definition can include a name, an upstream port, a downstream port, an insertion type, a prototype path, and a layout parameter (for test source definitions). Each of the insertions is associated with a flow of the first graph. Insertions can be probes or test sources.

One or more components are generated that each corresponds to one of the defined insertions (706). Examples of insertion components include the test source insertion 422 and the probe insertion 420 of FIGS. 4*a-d*. The test source insertion 422 is associated with the replicate-reformat flow 116 of the graph 100, and the probe insertion 420 is associated with the gather-output data sink flow 118 of the graph 100.

A second graph is generated that includes components and flows that correspond to at least some of the components and flows of the first graph. The second graph also includes the one or more generated components. The graphs 400*a-d* shown in FIGS. 4*a-d* are examples of the second graph. Each of the generated components is associated with a particular flow of the first graph. The second graph includes flows that correspond to these particular flows, and each of the generated components is associated with its respective corresponding flow in the second graph. For example, with reference to the graphs 400*a-d*, the test source insertion 422 is associated with the flow 416, which corresponds to the flow 116 of the first graph 100 of FIG. 1. The test source insertion 422 provides data to the reformat component 408, which corresponds to the reformat component 108 of the first graph 100. The probe insertion 420 is associated with the flow 418, which corresponds to the flow 118 of the first graph 100. The probe insertion 420 monitors data that passes from the gather component 412, which corresponds to the gather component 112 of the first graph 100. The second graph is generated and executed without the first graph 100 being modified.

While we described a compiler (e.g., compiler 308 of FIG. 3 and compiler 512 of FIG. 5) that can compile the graph and the overlay specification to create a second graph that includes the insertions defined by the overlay file, in some implementations, the graph and the overlay specification are not compiled. For example, the graph and the overlay specification can be executed directly without being compiled. An interpreter can execute the graph and the overlay specification directly by translating each statement into a sequence of one or more subroutines that are already compiled into machine code.

While we have described insertions in the form of probes and test sources, in some implementations, insertions can take on other forms. Insertions can broadly be used to inject data at a given point of a graph and pull data from a given point of a graph. For example, an insertion can be designed to monitor the quality of data passing through a flow of a graph. If data quality falls below a threshold, a user can receive an automated alert. Further description of insertions can be found in U.S. application Ser. No. XYZ, the contents of which are incorporated here by reference in their entirety.

The debugging approach described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of graphs. The modules of the program (e.g., elements of a graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A computer-implemented method of generating a computer-executable graph for debugging operations based on a specification that is separate from the computer-executable graph, the method including:

receiving a first computer-executable graph that includes components and flows, the components representing operations performed on data records, the flows representing flows of data records between components;

receiving a specification that is separate from the first computer-executable graph, the specification defining one or more insertions, each of the insertions being indicative of at least one graph component to be inserted into the first computer-executable graph and identifying a flow of the first computer-executable graph into which the at least one graph component is to be inserted;

generating one or more graph components that correspond to the one or more insertions defined by the specification; and generating a second computer-executable graph that includes components and flows that correspond to at least some of the components and flows of the first computer-executable graph and the one or more generated graph components that correspond to the one or more insertions defined by the specification.

2. The method of claim 1, wherein at least one of the generated graph components is a probe that is configured to monitor data related to one or more data records as the one or more data records pass between components of the second computer-executable graph.

3. The method of claim 2, wherein the probe is configured to store the data related to the one or more data records.

4. The method of claim 1, wherein at least one of the generated graph components is a test source that is configured to provide data to one of the components of the second computer-executable graph.

5. The method of claim 1, further including executing the second computer-executable graph.

6. The method of claim 5, wherein fewer than all of the components of the second computer-executable graph are executed.

7. The method of claim 6, wherein the components of the second computer-executable graph that are executed include components whose operations impact one or more of the generated graph components.

8. The method of claim 7, wherein one of the generated graph components is a probe, and the components of the second computer-executable graph that are executed include components that provide data to the probe.

9. The method of claim 8, wherein one or more components of the second computer-executable graph that reside downstream from the probe are not executed.

10. The method of claim 7, wherein one of the generated graph components is a test source, and one or more components of the second computer-executable graph that reside upstream of the test source are not executed.

11. The method of claim 5, further including:
modifying a parameter associated with one of the components of the second computer-executable graph;
determining whether the modified component, when executed, impacts any of the generated components; and
re-executing the second computer-executable graph.

12. The method of claim 11, wherein, if the modified component, when executed, does not impact any of the generated components, the modified component is not re-executed.

13. The method of claim 12, wherein one of the generated components is a probe, and the modified component resides upstream of a flow associated with the probe.

14. The method of claim 1, wherein the first computer-executable graph and the specification are stored in separate files.

15. The method of claim 1, wherein the first computer-executable graph and the second computer-executable graph are stored in separate files.

16. The method of claim 1, wherein the second computer-executable graph is a shell script that is not stored in a file.

17. The method of claim 1, wherein, in the second computer-executable graph, at least one of the generated graph components provides data to a component that corresponds to a component in the first computer-executable graph that receives data from the flow that is associated with the at least one generated graph component.

18. The method of claim 1, wherein, in the second computer-executable graph, at least one of the generated components receives data from a component that corresponds to a component in the first computer-executable graph that provides data to the flow that is associated with the at least one generated graph component.

19. The method of claim 1, wherein the second computer-executable graph is generated without the first computer-executable graph being modified.

20. The method of claim 1, wherein generating the second computer-executable graph includes:
generating a copy of at least a portion of the first computer-executable graph; and
modifying the copy of the first computer-executable graph to include the one or more generated graph components.

21. A system including:
means for receiving a first computer-executable graph that includes components and flows, the components representing operations performed on data records, the flows representing flows of data records between components;
means for receiving a specification that is separate from the first computer-executable graph, the specification defining one or more insertions, each of the insertions being indicative of at least one graph component to be inserted into the first computer-executable graph and identifying a flow of the first computer-executable graph into which the at least one graph component is to be inserted;
means for generating one or more graph components that correspond to the one or more insertions defined by the specification; and
means for generating a second computer-executable graph that includes components and flows that correspond to at least some of the components and flows of the first computer-executable graph and the one or more generated graph components that correspond to the one or more insertions defined by the specification.

22. A computer system including:
a processor configured to:
receive, from a code repository, a first computer-executable graph that includes components and flows, the components representing operations performed on data records, the flows representing flows of data records between components; and
receive, through a user interface, a specification that is separate from the first computer-executable graph, the specification defining one or more insertions, each of the insertions being indicative of at least one graph component to be inserted into the first computer-executable graph and identifying a flow of the first computer-executable graph into which the at least one graph component is to be inserted; and a compiler configured to:
- generate one or more graph components that correspond to the one or more insertions defined by the specification; and
- generate a second computer-executable graph that includes components and flows that correspond to at least some of the components and flows of the first computer-executable graph and the one or more generated graph components that correspond to the one or more insertions defined by the specification.

23. A non-transitory computer-readable device storing a computer program, the computer program including executable instructions for causing a computer to:
- receive a first computer-executable graph that includes components and flows, the components representing operations performed on data records, the flows representing flows of data records between components;
- receive a specification that is separate from the first computer-executable graph, the specification defining one or more insertions, each of the insertions being indicative of at least one graph component to be inserted into the first computer-executable graph and identifying a flow of the first computer-executable graph into which the at least one graph component is to be inserted;
- generate one or more graph components that correspond to the one or more insertions defined by the specification; and
- generate a second computer-executable graph that includes components and flows that correspond to at least some of the components and flows of the first computer-executable graph and the one or more generated graph components that correspond to the one or more insertions defined by the specification.

24. A computer-implemented method of generating a computer program for debugging operations based on a specification, the method including:
- identifying a data processing element of a first version of a computer program, the data processing element configured to i) receive data from or ii) provide data to a first data element;
- generating a component that represents a second data element according to a specification defining one or more insertions, at least a first insertion of the one or more insertions identifying the component that represents the second data element and a location in the computer program into which the component that represents the second data element is to be inserted; and
- generating a second version of at least a portion of the computer program, the second version of the computer program including the identified data processing element and including
- the generated component, the generated component being generated and arranged within the second version of the computer program according to the defined first insertion such that the identified data processing element in the second version of the computer program i) receives data from or ii) provides data to the generated component.

25. The method of claim 24, including receiving the first version of the computer program.

26. The method of claim 24, wherein generating the second version of at least a portion of the computer program includes generating a copy of the portion of the computer program.

27. The method of claim 26, including modifying the copy of the portion of the computer program to include the generated component.

* * * * *